Jan. 19, 1926. 1,570,148
V. H. HERR
FASTENER
Filed April 27, 1925
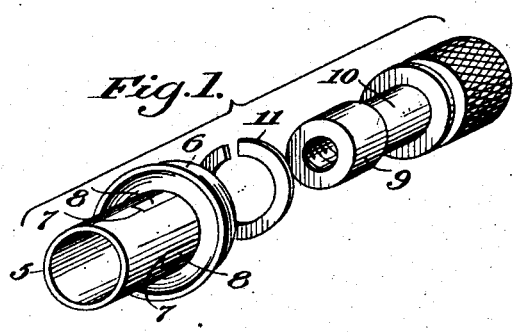
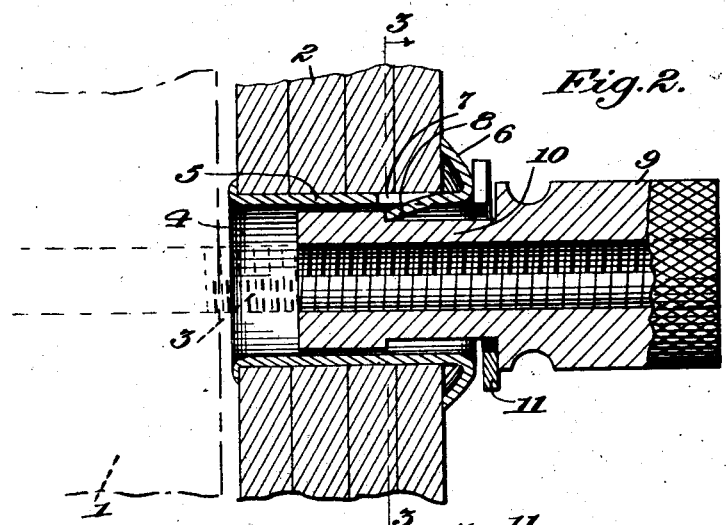
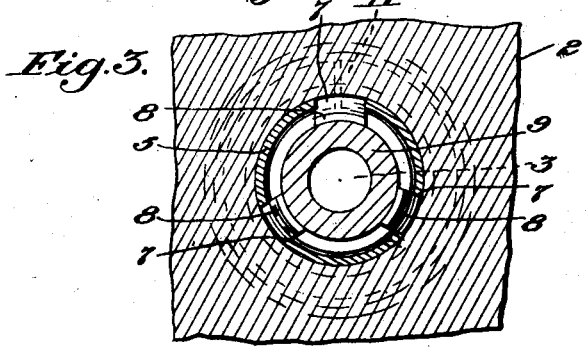
Inventor:
Von H. Herr,
By Rinden + Rinden
Att'ys.

Patented Jan. 19, 1926.

1,570,148

UNITED STATES PATENT OFFICE.

VON H. HERR, OF PHILADELPHIA, PENNSYLVANIA, ASSIGNOR OF ONE-THIRD TO CHARLES W. HERR, ONE-THIRD TO FRANK H. MATTINGLY, AND ONE-THIRD TO ROBERT V. WILLETT.

FASTENER.

Application filed April 27, 1925. Serial No. 26,160.

*To all whom it may concern:*

Be it known that I, VON H. HERR, of Philadelphia, Pennsylvania, a citizen of the United States, have invented certain new and useful Improvements in Fasteners, of which the following is a specification.

This invention relates to fasteners and has special reference to devices for securing a plate, sheet or other article to a fixed support, the object of the invention being to provide a fastening device which will firmly hold the supported member to the support while in use, but will permit its ready release when its use is no longer desirable, the fastening device being carried by the supported member in such a manner that it can not be easily detached therefrom and lost, and remains secured in the supported member when the same is stored away.

One embodiment of the invention is illustrated in the accompanying drawing and fully set forth in the annexed specification and claims.

In the drawings—

Figure 1 is a perspective view of a fastener embodying the invention with the parts disassembled but approximately in their proper relative positions;

Figure 2 is an enlarged longitudinal section showing the use of the fastener; and Figure 3 is a transverse section on the line 3—3 of Figure 2.

While the improved fastener may be employed in many arts, it is designed more particularly for use in securing radiator shields or aprons upon the radiators of automobiles, and in the accompanying drawing the reference numeral 1 indicates a portion of the frame of an automobile radiator, while the numeral 2 designates a portion of a shield or curtain which is hung on the front of the radiator in cold weather.

In accordance with this invention threaded studs 3 are provided on the front end of the radiator in such numbers and at such points as may seem most desirable, and openings 4 are provided through the shield or curtain to receive the studs. A bushing or bearing sleeve 5 is fitted snugly in each opening 4 and has a diameter appreciably greater than the diameter of the stud, the rear end of the bushing being upset or otherwise permanently secured to the shield. At its front end the bushing or sleeve 5 is constructed with an annular flange or rim 6 which is crimped or pressed against the face of the curtain or shield, as shown in Figure 2, and immediately adjacent the flange U-shaped slits 7 are cut in the body of the sleeve, thereby defining tongues 8, which are pressed inwardly to project toward the rear end of the sleeve or bushing and partly across the bore thereof. An elongated sleeve nut 9 is rotatably mounted in the bushing 5 and its threaded bore is adapted to engage a threaded stud 3, so that as the nut is turned home the shield or curtain will be secured in place. The nut is constructed with an external annular groove 10 into which the tongues 8 spring when the nut is inserted in the bushing and pushed beyond the tongues, as will be understood on reference to Figure 2. A washer 11 is fitted around the nut within the groove 10 to reduce the play between the flange 6 of the bushing 5 and the shoulder defined by the outer end of the groove 10. The washer also prevents access to the tongues 8 and provides an expanded bearing surface between the flange 6 and the front annular shoulder on the nut, the ends of the tongues 8 bearing against the rear annular shoulder and thereby preventing withdrawal of the nut which is permanently swiveled within the bushing.

It will be readily seen that I have provided a fastening device which will effectually secure a shield to a radiator and will be permanently attached to the shield so that it can not readily be lost.

Having thus fully described my invention, what I claim as new and desire to secure by Letters Patent of the United States is—

1. A fastener comprising a bushing to be secured in a member to be fastened, the bushing formed with inwardly and rearwardly projecting tongues struck therefrom, a sleeve nut swivelled in the bushing to engage a mating member projecting from a support and means formed in the sleeve nut to receive said tongues.

2. A fastener comprising a threaded stud projecting from a support, a bushing to be secured in a member to be supported, portions of said bushing pressed inwardly and forming stop tongues projecting into the bore of the bushing and a sleeve nut to be inserted in the bushing and effect threaded engagement with the stud, the nut being constructed with an external annular groove to receive the stop tongues of the bushing.

3. A fastener comprising a threaded stud, a bushing secured in a member to be fastened and receiving the stud, the bushing being provided at its front end with an annular flange abutting said member, and with inwardly and rearwardly projecting tongues adjacent said flange, a sleeve nut inserted in the bushing and having threaded engagement with the stud, said nut having an external annular groove receiving the tongues and a washer fitted in said groove between the front end of the same and the flange on the front end of the bushing.

4. A fastener comprising a threaded stud, a bushing secured in a member to be fastened and receiving the stud the bushing being provided at its front end with an annular flange abutting said member, said bushing having U-shaped slits therein, inwardly and rearwardly projecting tongues formed by pressing inwardly the material within said slits, a sleeve nut inserted in the bushing and having threaded engagement with the stud, said nut having an external annular groove receiving the tongues.

In testimony whereof I hereunto affix my signature.

VON H. HERR.